United States Patent [19]
Stiltner et al.

[11] Patent Number: 5,367,301
[45] Date of Patent: Nov. 22, 1994

[54] METHOD AND SYSTEM FOR DECODING DIGITAL AUDIO FILES

[75] Inventors: Nelson H. Stiltner, Pensacola, Fla.; Jesse M. Martinez, Denver; Roger S. Hutchison, Golden, both of Colo.

[73] Assignee: CD ROM, Inc., Colo.

[21] Appl. No.: 969,779

[22] Filed: Nov. 10, 1992

[51] Int. Cl.⁵ .............................................. H03M 1/66
[52] U.S. Cl. ...................................... 341/144; 371/68.3
[58] Field of Search ................. 341/144; 84/601, 602, 84/603; 371/68.3, 70

[56] References Cited

U.S. PATENT DOCUMENTS

| | | | |
|---|---|---|---|
| 4,177,708 | 12/1979 | Pinz et al. | 84/603 |
| 4,314,369 | 2/1982 | Caillet et al. | 371/69.1 |

OTHER PUBLICATIONS

Magid, Lawrence J., "SoundBlaster Pro & Nautilus CD-ROM", Bay Area Computer Currents, May 5–18, 1992, p. 48

*Primary Examiner*—Brian K. Young
*Attorney, Agent, or Firm*—Albert C. Smith

[57] ABSTRACT

A system (99) and a method decodes digital audio data (126) by identifying circuits (112) on peripheral devices (119) attached to a computer (113) or peripheral interfaces (107), such circuits capable of performing digital to analog conversions, and sending to these circuits during an interrupt (133), digital audio data (126) for conversion to analog form (128) and outputting to conventional audio stages (139, 141). Because the system and method employs existing circuitry to perform the digital decoding they do not require the use of additional processing hardware to be implemented solely for the decoding process.

10 Claims, 4 Drawing Sheets

5,367,301

METHOD AND SYSTEM FOR DECODING DIGITAL AUDIO FILES

BACKGROUND OF THE INVENTION

1. Field of Invention

The invention relates to systems and methods for decoding electronic files, particularly, such files containing digitally-encoded audio information.

2. Description of Related Art

Many computer applications afford the use of digitally-encoded audio files to enhance the value of the application to the user. Some educational and entertainment computer applications, for example, rely on the use of digital audio files to enhance the user's experience. The problem with affording the use of digital audio files is that, generally, personal computers do not have the necessary internal circuitry to decode such digital data. This requires the user to purchase and install additional dedicated processing hardware, known as "sound cards," to perform the decoding and outputting of digital audio files. In addition, the current lack of industry standards for the design of such sound cards results in individual sound cards being dedicated to decoding a limited variety of differently encoded audio files. This results in the user having to purchase various sound cards to perform different types of decoding, further increasing the cost to the user of using digital audio. Accordingly, there is a need for decoding digital audio files without using hardware dedicated solely to such use.

SUMMARY OF THE INVENTION

The present invention decodes digital audio files by identifying integrated circuits embedded in peripheral devices coupled to a computer which are capable of performing the digital to analog conversion required for digital decoding. The peripheral devices are those that are not designed as sound cards dedicated to perform digital-to-analog conversions, and can be Compact Disk Read Only Memory (CD-ROM) players, devices conforming to the Small Computer Systems Interface (SCSI) standard, or devices conforming to the AT interface standard. The digital-to-analog integrated circuits on these peripheral devices are normally idle, being used only when throughputting data from the peripheral device, and they afford available processing power that can be used for other tasks. Accordingly, the digital audio data to be decoded is sent to these circuits when they are idle, and the circuits are instructed to decode the digital data and output it to available audio output channels.

DETAILED DESCRIPTION OF THE PREFERRED EMBODIMENTS

Figure 1:
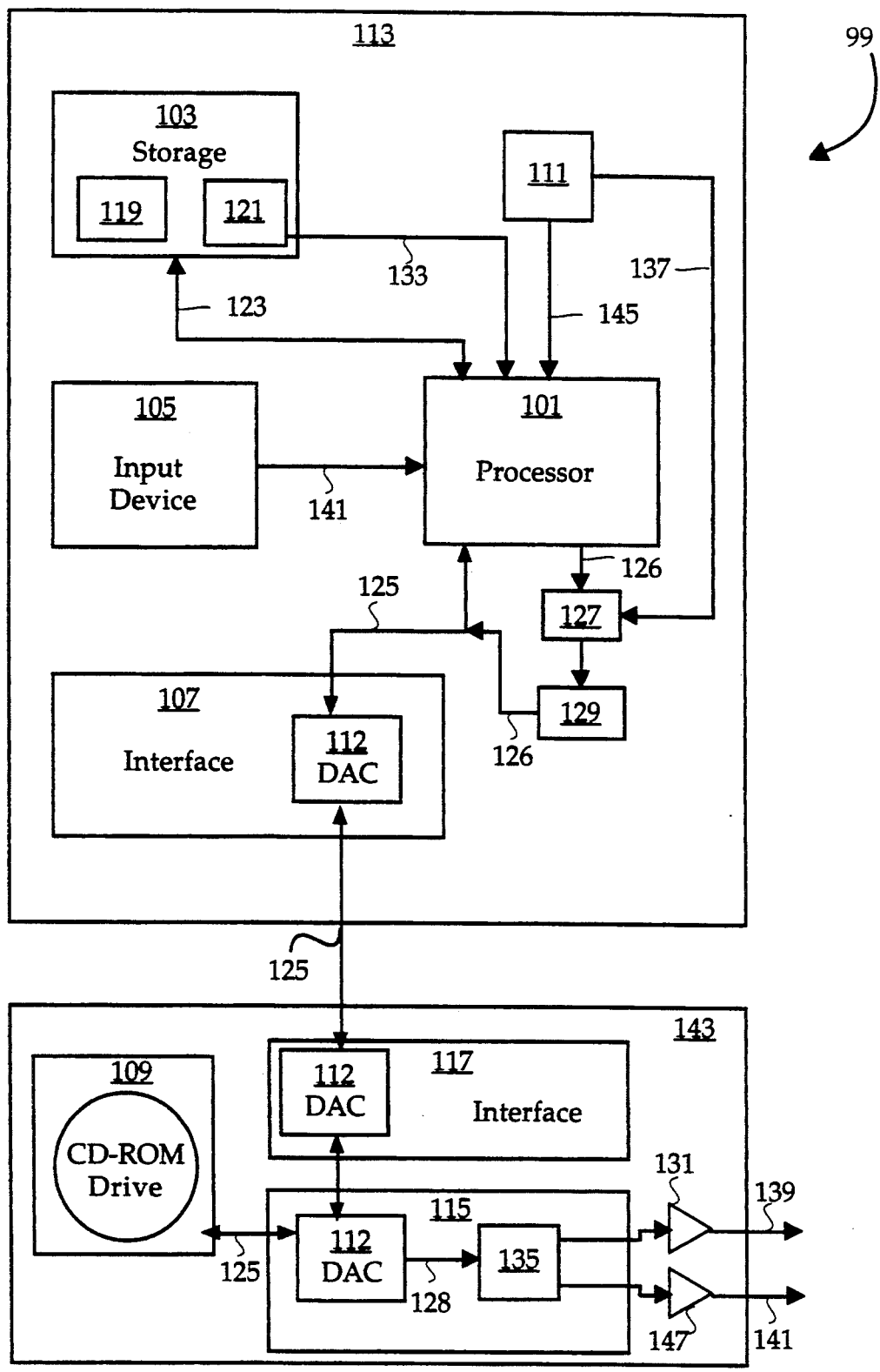
FIG. 1 is a logic block diagram illustrating system 99 for decoding digital audio files employing processor 101 reading digital data 125 from CD-ROM player 143 through interface 107 and decoding the digital audio data 126 with shift register 127, combinatorial logic 129 and digital-to-analog chips 112 on interfaces 117 and 115.

FIG. 1 shows a logic block diagram of system 99 for decoding digital audio data. Computer 113 comprises a processor 101, a storage unit 103, such as random access memory (RAM), an input device 105, and a hardware interface 107 for attaching peripheral devices, such as a Small Computer Systems Interface (SCSI) compatible interface, or an AT-compatible interface. Storage 103 contains memory map 119 for storing the addresses of peripheral devices attached to computer 113, including the addresses of digital-to-analog (DAC) circuits 112. DACs 112 are conventional digital-to-analog circuits, such as a Burr Brown PCM 66P. Clock 111 sends clock signals 145 to processor 101 to control its operation. Processor 101 is coupled to shift register 127, which is a 1-2k buffer for storing digital audio data 126 during pre-processing. Shift register 127 is clocked by clock signals 137 from clock 111. Shift register is coupled to combinatorial logic 129 which converts digital audio data 126 to two's complement form, and outputs it to interfaces 107,117 or 115 through data line 125.

Interface 107 provides computer 113 with a hardware interface to receive and transmit data to external peripheral devices over data line 125, such as those conforming to the AT or SCSI standards. Compact Disk, Read Only Memory (CD-ROM) player 143 is a typical peripheral device coupled to computer 113, and contains a SCSI interface 117 coupled to a CD-ROM interface 115 for transmitting data from a CD-ROM disk mounted on CD-ROM disk drive 109. Interfaces 107,117 and 115 each contain DACs 112, which perform digital-to-analog conversion on digital audio data 126. DACs 112 on these interfaces are coupled through the interface ports to processor 101. On system start-up the addresses of these DACs 112 are stored in memory map 119, where they are later accessed by computer program 121, as further described below.

The CD-ROM disk in CD-ROM drive 109 typically contains digitally-encoded text, graphics and audio information which must be decoded by computer 113 for use by the user. CD-ROM interface 115 conventionally accepts digital data from CD-ROM drive 109 and converts it to the appropriate format for transmission through interface 117 to processor 101. Digital audio data 126 decoded by system 99 is sent as analog signals 128 to a programmable latch 135 which outputs the analog signals 128 to either preamplifier 131 for preamp level audio output 139, or amplifier 147 for amplified audio output 141, such as a headphone audio jack.

Processor 101 loads computer program 121 from storage 103, which directs processor 101 to perform the various functions of computer 113. Computer program 121 may be written in the Borland C++ programming language, and may be run on conventional hardware platforms, including personal computers or mainframes, operating under a variety of common operating systems. During operation computer program 121 is loaded into storage 103 and remains resident there during other computer operations by computer 113.

System 99 operates as follows. Computer program 121 effectively scans the available peripheral devices coupled to interface 107, identifying attached devices such as CD-ROM player 143, and detecting DACs 112 contained on interface 117 of CD-ROM player 119, CD-ROM interface 115, or interface 107. This identification is done by reading memory map 119 which contains the addresses of any DACs 112. Using memory map 119 allows computer program 121 to correctly determine the address location of each peripheral device, and its on-board DACs 112 attached to computer 113. Because CD-ROM interface 115, SCSI interface 117 or interface 107 all can use different types of DACs 112, identification of their addresses in memory map 119 allows computer program 121 to properly access their DACs 112 for digital-to-analog conversion, regardless of how many peripheral devices there are, how they are configured, or their interface type. This enables computer program 121 to send digital audio data 126 to DACs 112 for digital-to-analog conversion, instead of employing dedicated sound cards for this purpose. Identifying the memory address of the DACs 112 also determines the correct interrupt cycle to be used by computer program 121 when controlling processor 101 for processing digital audio data, as each different type of DAC 112 on the various interfaces operates at a different clock rate.

The user, through input device 105 and typical application software for accessing digital data, instructs processor 101 over data line 141 to access data, including digital audio data 126, stored on a CD-ROM disk in CD-ROM player 143. This data is transmitted over data line 125, through interfaces 115, 117 and 107, and is received by processor 101 for display or processing. Computer program 121 scans this data as it enters processor 101 over data line 125 and identifies any digital audio data 126 that needs to be digitally decoded by comparing the data values in file header 301 (FIG. 3) with data values known to identify pulse code modulated (PCM) or Multimedia Personal Computer (MPC) files containing digital audio data 126. When computer program 121 detects a file containing digital audio data 126 it sends an interrupt 133 to processor 101, taking over operation of processor 101 to begin the decoding of digital audio data 126. Using clock cycles 145 from clock 111, computer program 121 instructs processor 101 to transmit digital audio data 126 to shift register 127. Shift register 127 operates synchronously via clock signals 137, and buffers digital audio data 126 to ensure continuous audio output without audio breakup. When shift register 127 is full it sends digital audio data 126 to combinatorial logic 129, which transforms digital audio data 126 to two's complement form. Digital audio data 126 is then sent to data line 125 for transmission to any one of the DACs 112 which were identified from memory map 119. Because processor 101 transmits digital audio data 126 only during the interrupt cycle, digital audio data 126 is sent to the attached peripheral device only when it is are not transmitting data back to processor 101.

The receiving DAC 112 decodes the digital audio data 126 into analog signal 128. Analog signal 128 is output to programmable latch 135 for outputting to either preamplified level output 139 via preamplifier 131, or amplified output 141 via amplifier 147. Because system 99 utilizes DACs 112 on attached peripherals during a series of a interrupts to perform the digital decoding, it allows digital audio data 126 to be decoded independently of accessing additional dedicated hardware which must be purchased by the user.

Figure 3:
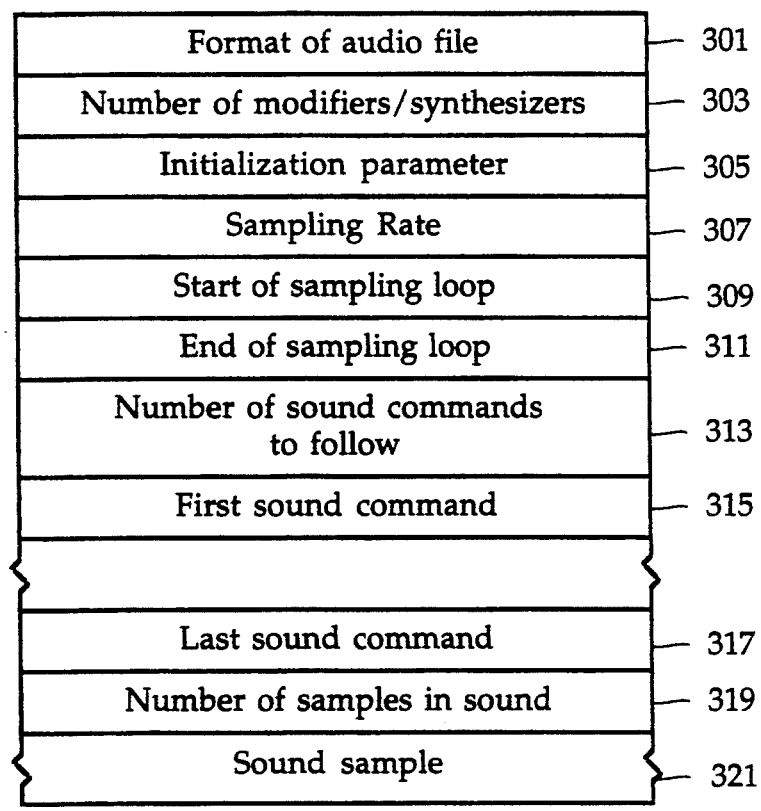
FIG. 3 is a schematic diagram of a typical digital audio data file 199 containing file headers 301-313, and data 315.

In detecting the presence of digital audio data 126 computer program 121 also determines the type of digital decoding necessary for the data by reading the data values 301–313 contained in the file header, as depicted in FIG. 3. For example, computer program 121 will distinguish between various digital audio file formats such as .WAV, .VOC, .SND, or MIDI. These are different formats for digitally encoding audio data. .WAV is a proprietary file format created by Microsoft Corp. for use in its Windows TM operating environment, and employs a virtual memory scheme which swaps data from hard disk storage to RAM during decoding. The .WAV file format contains a header field and a data field; the header indicates a .WAV type file, and the sampling rate of the data. The data is digitally sampled at either 8 bit or 16 bit quantization. .VOC is a file format designed by Creative Labs, Inc. for the DOS operating environment, and also contains a header identifying the sampling rate (44.1 KHz to 11.025 KHz), and sampled data..SND files are used in a RAM-only decoding method, which limits the size of the file to the amount of available memory; the file contains only sampled sound data. MIDI files contain instructions for use by digital synthesizers which describe the sounds to be created during playback. FIG. 3 illustrates a typical digital audio file 199, showing file headers 301 through 313, and data 315–317, and 321.

Figure 2:
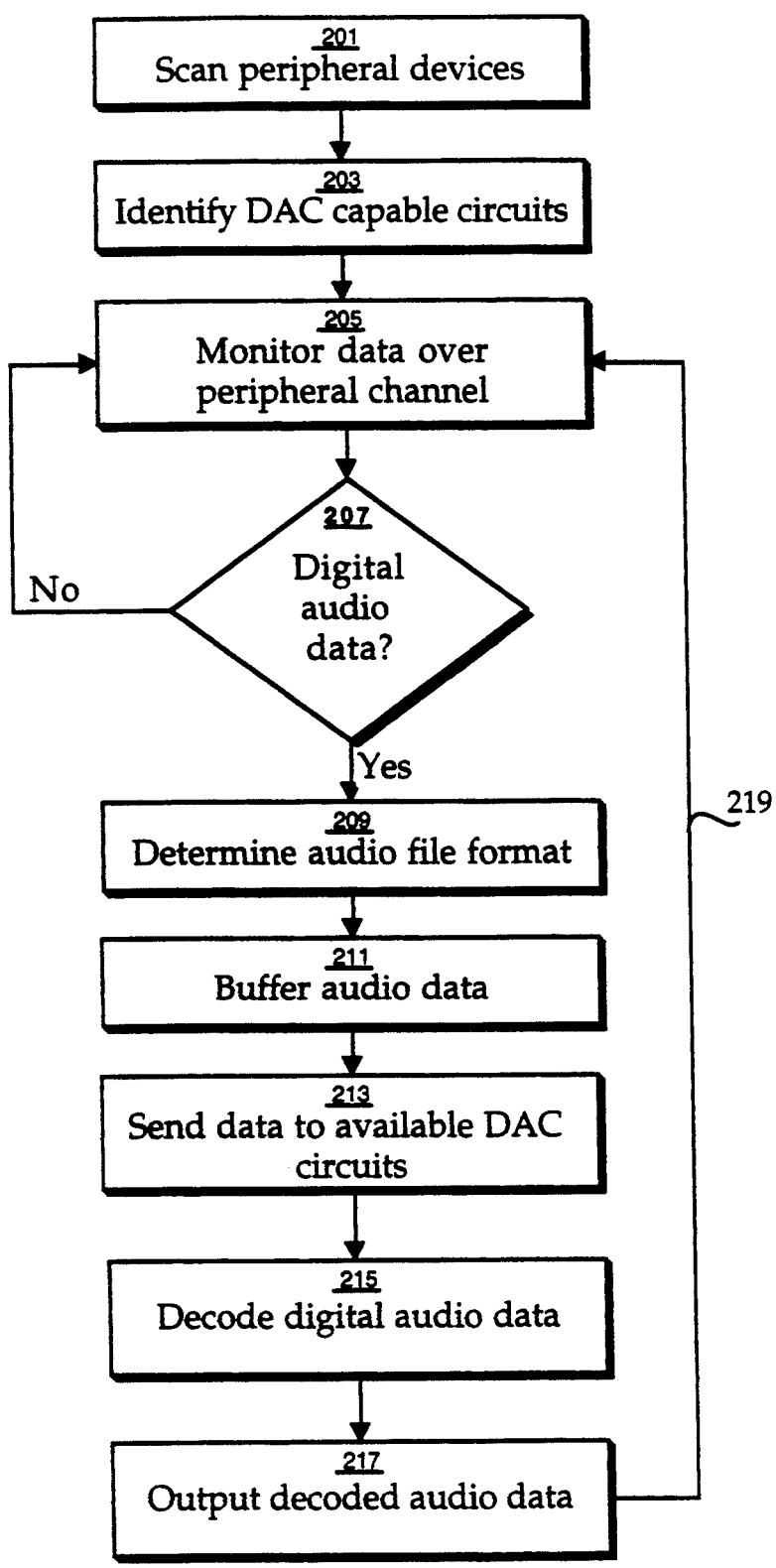
FIG. 2 is a flow chart illustrating the method of decoding digital audio files by identifying 203 digital to analog capable circuitry, monitoring 205 digital data, and sending 213 digital audio data to the appropriate decoding circuitry for decoding 215.

FIG. 2 shows a flow chart of a method for decoding digital audio data 126 which begins by scanning 201 for peripheral devices and interfaces 117 attached to a computer system 113, by reading the addresses of these devices stored in a computer memory map 119. The addresses of the peripheral devices are conventionally loaded into the computer memory map 119 during system start-up. The scanning identifies 203 those circuits 112 on the attached peripheral devices and interfaces which are capable of performing digital-to-analog conversions, by locating their addresses in the computer memory map 119. As each type of peripheral device interface has a different address location, this step further identifies the interrupt cycle used with these circuits, thereby enabling the method to access the peripheral device during an interrupt 133. These steps occur prior to use of the peripheral device to access digitally encoded files.

Once the user starts accessing digitally encoded files from the peripheral devices, the method continuously monitors 205 data that is being throughput from the peripheral device over the interface channel of the computer system to the computer's processor 101. By reading the file header of each data file transmitted to the processor, the method determines 207 whether the data is digital audio data 126 or other data types, such as text or graphics. If the data is not digital audio data 126, the method continues monitoring 205 the data transmitted from the peripheral device to the processor 101 via the interface channel. If the data through the interface channel is digital audio data 126, then the method determines 209 the audio file format by reading the file header of the data file, which contains data values identifying the type of digital data 301, the length of the data file 313, and the parameters of the digital encoding of the audio data (303–313). This determines the proper type of decoding for the digital audio file. The data file is then buffered 211 in a shift register 127 and converted to two's complement using combinatorial logic 129. The data is then sent 213 to the available DAC capable circuits 112 for decoding 215. After decoding 215, the data, now analog signals 128, is output 217 along conventional audio channels (139, 141). The method then loops 219 back to monitoring 205 the peripheral channel for further data being transmitted to the processor 101. The method stops when no further data is accessed on the peripheral device by the processor 101.

Figure 4:
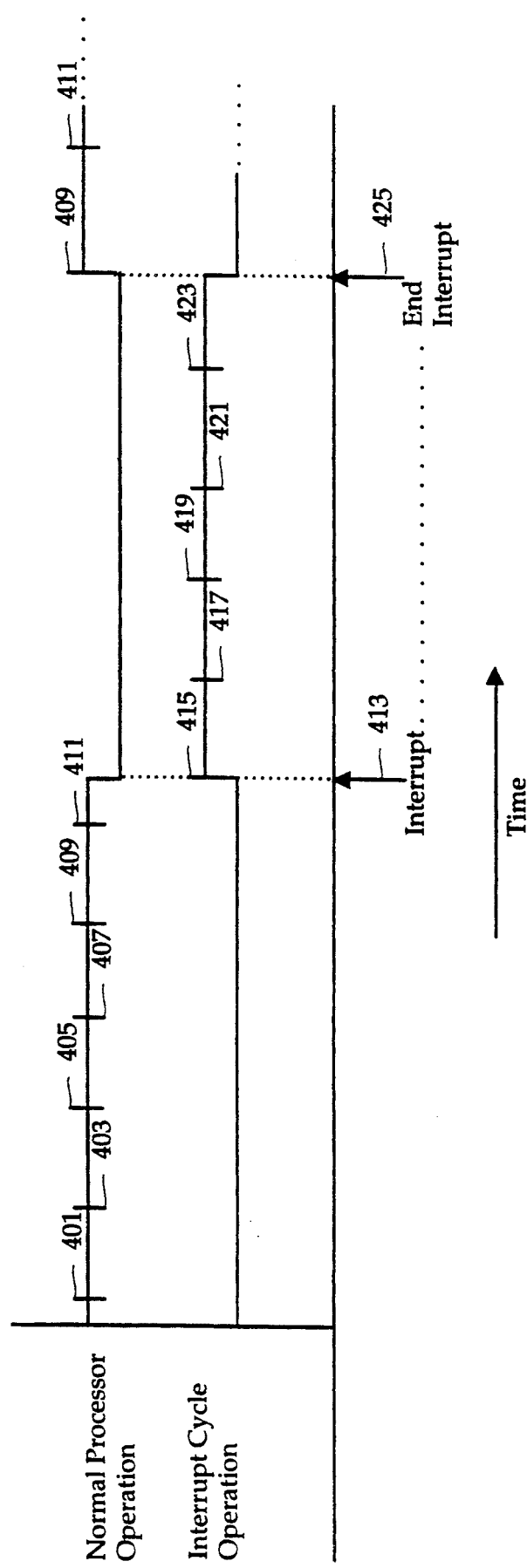
FIG. 4 is a schematic diagram of the timing sequence of the normal processor operation comprising system startup 401, memory map access 409 and monitoring 411 file headers of digital files received in processor 101, and interrupt cycle operation comprising buffering 415, decoding 419 and outputting 423 analog signals.

In summary, FIG. 4 illustrates the time sequence of the steps of the system and method described above for decoding digital audio data files. "Normal Processor Operation" refers to the normal system operation of processor 101 of computer 113. This period commences with system startup 401 and continues until interrupt 413 is sent by computer program 121 to processor 101. During normal processor operation, at system startup 401 the addresses of digital-to-analog circuits 112 on an attached peripheral device 143 or interface 107 are loaded 403 into memory map 119. The user then starts the operation of computer program 121 by loading 405 it in memory. The user then instructs processor 101 to access 409 digital data stored on an attached peripheral device such as CD-ROM player 143. As data is being read from the peripheral device into processor 101 for display or other output, computer program 121 is continuously reading 411 the file headers of the files being transmitted. When computer program 121 detects 412 a file header indicating that the file contains digital audio data 126, it sends an interrupt 413 (133 on FIG. 1) to processor 101, suspending its operation. All data addresses and memory contents are preserved during this suspended operation, which is transparent to the user. In other words, the user is essentially unaware that processor 101 has temporarily stopped accessing non-audio digital data from the peripheral device while computer program 121 takes over control of processor 101 for the purposes of controlling the decoding of digital audio data 126. The timing of the interrupt cycle with respect to other system events is dependent on the type of peripheral interface used by the peripheral device, as the different types of interfaces accommodated by computer program 121 (SCSI, AT, and CD-ROM) all employ different interrupt cycle times. The appropriate interrupt cycle is determined by computer program 121 based on the memory map 119 address of the DAC 112 on the device.

During the interrupt cycle, which preferably occurs at 18.2 times per second, and which lasts a predetermined number of clock cycles of clock 111, computer program 121 controls the operation of processor 101 and directs it to beginning the decoding of the digital audio data 126. Using clock cycles 137 from clock 111, the digital audio data file is buffered 415 in the shift register 127, either in serial or in parallel. When shift register 127 is full, digital audio data 126 is sent to combinatorial logic 129 for conversion to two's complement form. It is then transmitted 419 to a DAC 112 previously identified in memory map 119. DAC 112 performs digital-to-analog conversion on the received segment of digital audio data 126, based on the contents of the file header, and outputs 423 the resulting analog signal 128 to programmable latch 135 for output to either preamplified output 139 or amplified output 141. After the interrupt cycle ends 425, computer program 121 return control of processor 101, which then continues to access 409 digital data on the peripheral device until the next interrupt cycle. This cycling of operations between normal processor operation and interrupt cycle operation is transparent to the user, allowing her to simultaneously access digital data on the peripheral device such as text or graphics and listen to digital audio data 126.

We claim:

1. A system for decoding digital audio files in computer systems having peripheral devices attached to the computer system and containing digitally encoded audio data, comprising:

a processor for executing instructions and for receiving from and transmitting to any attached peripheral devices digital data;

a storage device coupled to the processor for storing instructions and data;

at least one peripheral device interface coupled to the processor for transmitting instructions and data to and from a peripheral device coupled thereto, the peripheral device interface containing at least one circuit capable of performing digital to analog conversions on digital audio data transmitted from the processor in response to instructions sent by the processor;

a controller means coupled to the processor for identifying any peripheral devices attached to a peripheral device interface, identifying on any peripheral device interface any circuits capable of performing digital to analog data conversions, scanning the peripheral device interface during the transmission of data from the peripheral device to the computer system, determining the presence and file format of digitally encoded audio data, and instructing the processor to transmit such data to the circuit identified as capable of digital to analog conversions, said circuit performing such conversions on received digitally encoded audio data; and an audio output channel coupled to the peripheral device for outputting digital audio data converted to analog signals by the circuit of the peripheral device.

2. The system according to claim 1 further comprising a shift register coupled to the processor for temporarily storing digital audio data prior to decoding by the circuit identified as capable of digital-to-analog conversions.

3. The system according to claim 1 wherein the controller means identifies attached peripheral devices, and identifies circuits on said attached peripheral devices capable of performing digital-to-analog conversions by reading addresses stored in a computer memory map.

4. The system according to claim 1 wherein the controller means interrupts the processor to transmit digitally encoded audio data to the digital-to-analog circuits identified on the peripheral device interface.

5. The system according to claim 1 further comprising a programmable latch for outputting the analog signal to either preamplified or amplified audio outputs.

6. The system according to claim 1 further comprising combinatorial logic coupled to the processor for transforming the digitally encoded audio data to two's complement form prior to decoding such data.

7. A method of decoding digital audio data in a computer system having attached peripheral devices containing digitally encoded audio data, a peripheral device interface for coupling the peripheral devices to the computer system, and a processor for processing data, comprising the steps of:

scanning a peripheral port for the existence of any attached peripheral devices;

identifying on any peripheral device interface, circuits capable of performing digital to analog conversion;

monitoring digital data transmitted over the peripheral device interface for the occurrence of digital audio data;

determining the file format of any digital audio data identified;

sending the digital audio data to the peripheral device interface circuits capable of performing digital to analog conversions;

converting digitally encoded data to analog form; and outputting the converted audio data to available audio channels.

8. The method according to claim 2 wherein the step of scanning a peripheral port comprises the step of reading a computer memory map address for the address of any attached peripheral devices.

9. The method according to claim 2 wherein the step of identifying on any peripheral device interface, circuits capable of performing digital to analog conversion comprises the steps of:

reading a computer memory map address for the address of such circuits;

determining from said address the type of peripheral device attached thereto; and, determining the appropriate interrupt cycle for controlling said circuits for decoding digitally encoded audio data.

10. The method according to claim 2 wherein the step of sending the digital audio data to the peripheral device interface circuits capable of performing digital to analog conversions comprises the steps of:

interrupting the processor;

instructing the processor to temporarily buffer said data to afford a continuous stream of said data to be sent to said circuits;

transforming said data to two's complement form; and, transmitting said data during the interruption of the processor to said circuits.

* * * * *